Aug. 1, 1950  J. H. WEHRENBERG  2,517,515
PICK INDICATOR
Filed Feb. 11, 1947
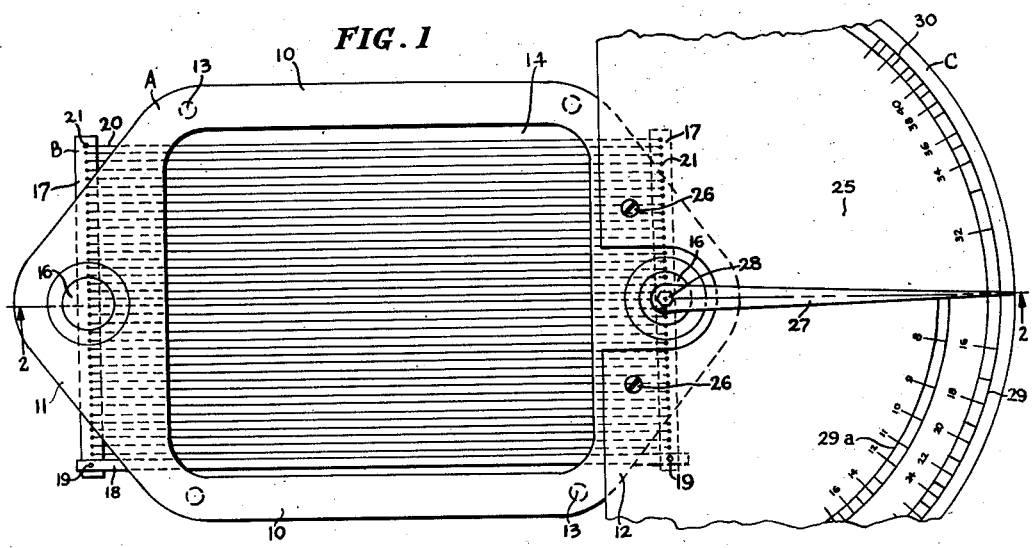
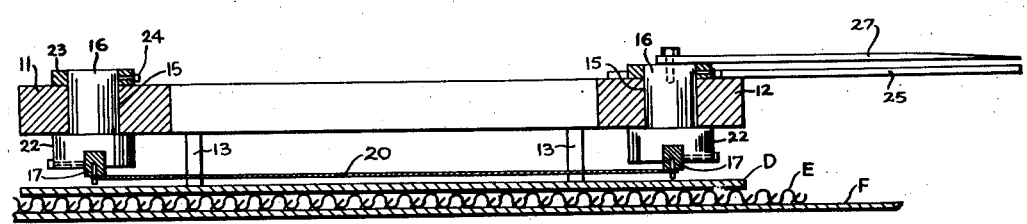
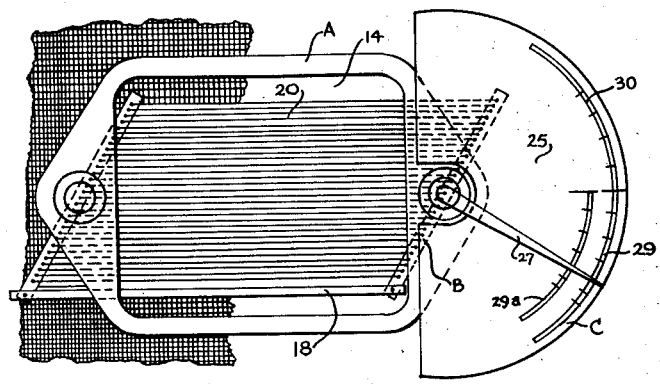
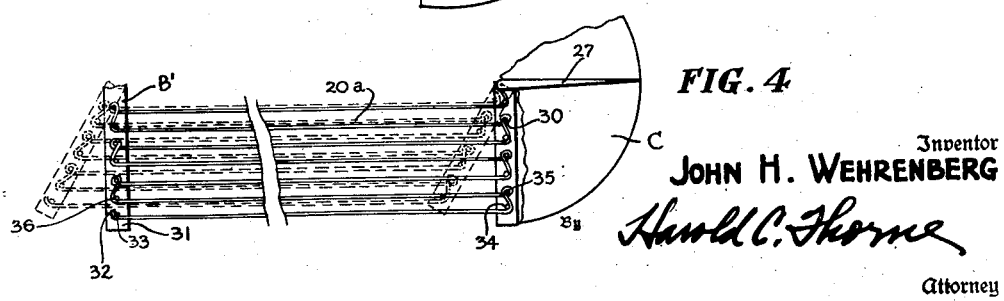
Inventor
JOHN H. WEHRENBERG
Harold C. Thorne
Attorney Patented Aug. 1, 1950

2,517,515

UNITED STATES PATENT OFFICE 2,517,515

PICK INDICATOR

John Herman Wehrenberg, Woodsdale, N. C.

Application February 11, 1947, Serial No. 727,864

6 Claims. (Cl. 33—174)

This invention relates to pick count mechanism and the like comprising a parallel line instrument which is adjustable so that the lines will coincide with the lines of mesh or more particularly pick threads of woven fabric, with an indicator thereon which gives a direct reading of the count in accordance with the adjustment of the lines of the instrument.

In the art of weaving, it is essential to maintain a definite number of pick threads to the inch for uniformity of quality and weight, and after the weaving the fabric is examined with respect to such pick count. Heretofore such examination has been made with measuring devices having fixed parallel or diagonally spaced lines positioned over the woven goods to be inspected and the count was obtained by optical means as disclosed by way of example in Circular 39 of the Bureau of Standards (December 16, 1912), pages 9 and 10, and patents Servais, 1,478,536, of December 25, 1923, and Luhn, 1,831,536, of November 10, 1931.

In accordance with the present invention, however, and as its principal object, I have provided a pick indicator with parallel lines or filaments which may be adjustably moved as to their distance apart so as to exactly coincide with and overlie threads or lines of the fabric mesh or the like over which the instrument is positioned. For coarse weave the adjustment may be determined by direct inspection but for finer weaves it is desirable to position the specimen over a transparent base and project light through it and the instrument; also employ a magnifying glass as an aid to obtaining the correct adjustment.

As another object of the invention I have provided indicating means movable directly by the movement of the parallel line adjusting means and a scale cooperating therewith calibrated in direct counts denoting the number of lines to the inch in accordance with the spacing of the parallel lines, that is the pick thread count or spacing of mesh lines or the like.

A further object is to provide the instrument with a double scale, one indicating the count when the lines are coincident with each thread or line of the specimen under examination and the other where the instrument is adjusted so that the parallel lines are coincident with alternate lines of the specimen.

Further objects, details and advantages of my invention will appear in the following detail description of an instrument in accordance with my invention as illustrated in the accompanying drawings forming a part of this specification which is highly satisfactory in its operation with a saving of time and a high degree of accuracy as compared with any pick indicating devices heretofore employed.

In the drawings:

Fig. 1 is a plan view of a pick indicator in accordance with my invention.

Fig. 2 is a vertical sectional view thereof taken on line 2—2 of Fig. 1.

Fig. 3 is a plan view of the same indicator in an adjusted position over a section of fabric as it is employed in examining the specimen, and Fig. 4 is an enlarged fragmentary bottom plan view illustrating a method of mounting the wires or thread lines of the instrument.

Referring to the drawings, the instrument in accordance with my invention comprises a main supporting frame A carrying an adjustable parallel line frame B with an indicator C operating in conjunction with said two frames. The instrument in operation preferably has an intervening glass plate D as a support for it over the specimen E, which in the case of fabric maintains it in a flat position and allows the instrument to be moved relatively thereto while making the adjustment of its parallel lines. In making such measurements it is desirable to place the section of fabric over a glass base F, and project light through it and the indicating instrument; also magnifying glasses or microscopes and the like of well known types, may be employed above the instrument to advantage particularly when inspecting fine count weave or mesh.

Main supporting frame A as shown in Figs. 1, 2 and 3 comprises side members 10 and end members 11 and 12 which are rigidly connected or may be integral, if desired, of metal, wood or other suitable material such as a plastic formation. These side and end members provide the frame with a preferably rectangular opening 14 through which the lines of the parallel line frame and threads of the fabric or mesh may be viewed in using the instrument and is formed with downwardly extending feet 13 which slidingly rest on the supporting glass plate D over the specimen E under examination. Feet 13 support the frame above the glass and specimen sufficiently for mounting the parallel line frame B with its lines on its underside in close proximity to the specimen.

End members 11 and 12 of frame A are formed with vertical cylindrical bearing openings 15 therethrough preferably along the centerline of the frame through which pivot shafts 16 of parallel line frame B. Frame B comprises a pair of end members 17 the mid portions of which are secured to the lower ends of shafts 16 and a side brace or bar 18 is connected at its ends to ends of the end members 17 by means of pivots 19 the axes of which are equidistant from the axes of pivot shafts 16 and the same distance apart from each other as the axes to the two pivot shafts 16 so that the end members 17 of frame B may be turned with respect to frame A and are always parallel to each other. On frame B are mounted line elements 20 or filaments of wire, fine nylon thread or other flexible and relatively non-stretchable material in equally spaced parallel relationship with respect to each other. These lines are mounted on pins as hereinafter described or threaded through apertures 21 or the like in end members 17 in a manner to maintain them equally spaced and parallel at all times and so that the lines will be uniformly spaced for all angularly adjusted positions of the end frame members, thus corresponding with different pick counts of fabric, various mesh sizes and the like.

As shown shafts 16 are provided with shoulders 22 which space frame B slightly below frame A for free swinging movements with repect thereto, and collars 23 are secured on shafts 16 adjacent to the upper ends thereof by means of set screws 24 so as to provide a proper fit for the swinging movements and adjustments of the parallel line frame B.

The indicator C cooperating with the adjustable parallel line frame B and main supporting frame A includes a scale 25 secured by screws 26 to end member 11 of frame A and a pointer 27 which swings over scale 25 in accordance with movements of the parallel line frame being secured to the upper end of the pivot shaft 16 extending through end 11 of frame A and being secured thereto by means of a set screw or the like 28. The pointer is set with respect to the pivot shaft so that when the end members 21 are at right angles to the central axes of both pivot shafts 16, the pointer will be in the mid position of scale 25 as shown in Fig. 1.

Scale 25 is calibrated to indicate the number of lines to the inch along one side along the border 29 while the other side is calibrated along the border 30 to indicate double that number though other multiples and additional calibrations may be applied as will readily be understood. The mid position calibration corresponds to the minimum line count of lines 20 that is when the parallel line frame B is in the position shown in Fig. 1, a spacing of 15 to the inch being a satisfactory minimum spacing for the pick count for fabrics in most clothing and the like textiles. For mesh or pick count having greater spacing of course every other line of lines 20 might be employed and in such case a corresponding pick or mesh count calibration 29a or the reading of calibration 29 could be halved.

In operation, preferably, the instrument is placed over the glass plate D which is positioned over the fabric. It is then moved so that lines 20 of parallel line frame B are parallel to the pick threads of the fabric and frame B is swung to an adjusted position so that the successive lines 20 are brought together so as to overlie successive pick threads of the fabric as shown in Fig. 3. In such position the pick count on calibration 29 is indicated by the position of pointer 27, that is 22 being the spacing of lines 20 when the end members 17 of frame B are at the angle shown, the lines 20 having been moved together from the maximum spacing of 15 lines to the inch to the spacing indicated, this being the pick or mesh count of the specimen. An increase of the angle brings the lines 20 still closer as shown by the calibration 29 but for higher counts it is preferable to set the lines 20 over alternate threads of the mesh or fabric and thus it is more convenient to swing the adjustable parallel line frame in the opposite direction and rely on calibration 30 for direct reading of mesh or pick counts.

As referred to above fine Nylon threads or wires and the like may be employed for the parallel lines 20 and it is important that the spacing of such lines be maintained parallel and uniform. As an alternate arrangement instead of threading lines 20 through apertures in end members 17 lines 20a may be mounted on pins 30 as shown indicated in Fig. 4. In such arrangements the pins are equally spaced on the underside of the corresponding end members 31 of parallel line frame B', but since the pins have thickness it is essential that the lines should extend from the same sides of all the pins. Therefore in mounting the lines the end 32 of line 20a is secured to the first end member 31 thence passed successively around the lower sides of pins 33 and 34 of the pins 30, thence around pin 35 so as to engage the lower side of this pin and the opposite pin 36 as shown in Fig. 4. The mounting of the lines is thus continued until the lines 20a are mounted on the pins 30 of end member 31.

Obviously various other changes in construction may be resorted to as well as methods of operation of the instrument in making pick counts. Light under the specimen supporting glass base F facilitates the adjustment of the parallel line frame for pick counts and for fine materials magnifying glasses may be employed. Therefore, it is not desired to be limited to the details as set forth in connection with the specific construction as above described in detail.

What I claim as my invention and desire to secure by Letters Patent is:

1. A pick count indicator including a rigid supporting main frame structure comprising elongated side members connecting end members providing a rectangular open frame member, supports under said frame member for mounting it over a specimen of mesh construction, a frame including end members pivotally supported centrally thereof on the underside of the end members of said main frame so as to swing in a plane parallel and closely adjacent to the specimen, and uniformly spaced parallel filaments connected between said pivotally mounted end members.

2. A pick count indicator including a rigid supporting main frame structure comprising elongated side members connecting end members providing a rectangular open frame member, supports under said frame member for mounting it over a specimen of mesh construction, a frame including end members pivotally supported centrally thereof on the underside of the end members of said main frame so as to swing in a plane parallel and closely adjacent to the specimen, uniformly spaced parallel filaments connected between said pivotally mounted end members, and a bar pivotally connected with corresponding ends of said pivotally mounted end members to maintain them in parallel relation and a uniform stress on the parallel filaments in all angular positions of the end members with respect to the main frame.

3. A pick count indicator including a rigid supporting main frame structure comprising elongated side members connecting end members providing a rectangular open frame member, supports under said frame member for mounting it over a specimen of mesh construction, a frame including end members pivotally supported centrally thereof on the underside of the end members of said main frame so as to swing in a plane parallel and closely adjacent to the specimen, uniformly spaced parallel filaments connected between said pivotally mounted end members, count indicating means including a scale having calibrations in pick counts thereon mounted on an end member of the main frame, and a pointer carried by the corresponding pivotally mounted end member so as to cooperate with the calibrations of said scale.

4. A pick count indicator including a rigid supporting main frame structure comprising elongated side members connecting end members providing a rectangular open frame member, supports under said frame member for mounting it over a specimen of mesh construction, a frame including end members pivotally supported centrally thereof on the underside of the end members of said main frame so as to swing in a plane parallel and closely adjacent to the specimen, uniformly spaced parallel filaments connected between said pivotally mounted end members, count indicating means including a scale having calibrations in pick counts thereon mounted on an end member of the main frame, said calibrations, in one position on the scale corresponding directly with the spacing of said parallel filaments and in another position on the scale corresponding with a multiple of the spacing, and a pointer carried by the corresponding pivotally mounted end member so as to cooperate with the calibrations of said scale.

5. A pick count indicator including a rigid supporting main frame having a substantially rectangular opening therethrough, means on the bottom side of said main frame for supporting it above a specimen to be measured, an adjustable frame between said supporting frame and the specimen, said frame including end members, said end members mounted on pivot shafts extending through the end portions of the main frame centrally of and adjacent to the ends of the opening therethrough, a connecting link pivotally connected with an end of each of said adjustable frame end members to maintain them in parallel relation in all positions of angular adjustment of said members, equally spaced parallel filaments connected between said pivotally mounted end members of the adjustable frame, a scale mounted on one end of said main frame and extending outwardly therefrom with pick count calibration graduations thereon, and a pointer mounted on the upper end of the pivot shaft in the same end of the main frame extending over to cooperate with said calibration graduations to indicate the pick count in accordance with adjustment of the parallel filaments on the adjustable frame.

6. A pick count indicator including a rigid supporting main frame structure comprising elongated side members connecting end members providing a rectangular open frame member, supports under said frame member for mounting it over a specimen of mesh construction, a frame including end members pivotally supported centrally thereof on the underside of the end members of said main frame so as to swing a plane parallel and closely adjacent to the specimen, equally spaced pins extending from the under face of each of said pivotally mounted end members, a filament looped on said pins back and forth between said end members so as to extend over the same side of all pins of both end members to provide a plurality of equally spaced parallel filaments for all angular adjustments of the frame members, and a bar pivotally connected with corresponding ends of said pivotally mounted end members to maintain them in parallel relation and a uniform stress on the parallel filaments in all angular positions of the end members with respect to the main frame.

JOHN HERMAN WEHRENBERG.

REFERENCES CITED

The following references are of record in the file of this patent:

UNITED STATES PATENTS

| Number | Name | Date |
| --- | --- | --- |
| 1,134,106 | Clarke | Apr. 6, 1915 |
| 1,579,918 | Dieterich | Apr. 6, 1926 |
| 1,776,811 | Junkers | Sept. 30, 1930 |

FOREIGN PATENTS

| Number | Country | Date |
| --- | --- | --- |
| 17,711 | Great Britain | 1913 |